United States Patent
Storey et al.

(10) Patent No.: US 12,327,071 B1
(45) Date of Patent: Jun. 10, 2025

(54) INTERNAL SOLVER FOR ARTICULATIONS IN SIMULATION APPLICATIONS

(71) Applicant: Nvidia Corporation, Santa Clara, CA (US)

(72) Inventors: Kier Storey, Altrincham (GB); Michelle Lu, Altrincham (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/905,272

(22) Filed: Jun. 18, 2020

(51) Int. Cl.
| | |
|---|---|
| G06F 30/20 | (2020.01) |
| B25J 9/16 | (2006.01) |
| G06F 30/27 | (2020.01) |
| G06F 111/04 | (2020.01) |
| G06T 13/00 | (2011.01) |
| G06T 13/40 | (2011.01) |
| G06T 19/20 | (2011.01) |

(52) U.S. Cl.
CPC ............ *G06F 30/20* (2020.01); *B25J 9/1671* (2013.01); *G06F 30/27* (2020.01); *G06F 2111/04* (2020.01); *G06T 13/00* (2013.01); *G06T 13/40* (2013.01); *G06T 19/20* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 7,058,551 B2* | 6/2006 | Nakamura | ............. | B25J 9/1633 703/7 |
| 8,140,189 B2* | 3/2012 | Nagasaka | ............. | B25J 9/1671 318/568.17 |
| 8,508,537 B2* | 8/2013 | Collard | ................... | G06T 13/00 345/474 |
| 8,610,723 B2* | 12/2013 | Lee | ......................... | G06T 13/40 345/473 |
| 9,046,887 B2* | 6/2015 | Orita | ...................... | B25J 9/1633 |
| 9,747,717 B2* | 8/2017 | Fleishman | ............. | G06T 13/40 |
| 9,785,729 B2* | 10/2017 | Muller-Fischer | ....... | G06F 30/25 |
| 11,004,266 B2* | 5/2021 | Chang | ...................... | G06T 7/75 |

(Continued)

OTHER PUBLICATIONS

Kokkevis, Evangelos. "Practical physics for articulated characters." In Game Developers Conference, vol. 2004. 2004. 16 pages (Year: 2004).*

(Continued)

*Primary Examiner* — Akash Saxena
(74) *Attorney, Agent, or Firm* — Hogan Lovells US LLP

(57) ABSTRACT

Simulation of complex agents, such as robots with many articulation links, can be performed utilizing a pre-computed a response matrix for each link. When an impulse is applied to a link for this agent, the response matrix for a root node can be used to determine an impact of that impulse on the root node, as well as changes in velocity for any direct child node. This process can be performed recursively for each link down to the leaf links of a hierarchical agent structure. These response matrices can be solved recursively from root to leaf while only visiting each hierarchical link once. Such an approach can be used to solve a full set of constraints acting on the agent in an amount of time per solver iteration that is on the order of the number of links, or O(N) time per solver iteration.

20 Claims, 13 Drawing Sheets

(56) References Cited

U.S. PATENT DOCUMENTS

| | | | | |
|---|---|---|---|---|
| 11,200,356 | B2* | 12/2021 | Storey | G06F 30/20 |
| 11,615,222 | B2* | 3/2023 | Mitrovic | G01G 19/414 |
| | | | | 703/6 |
| 2005/0209535 | A1* | 9/2005 | Dariush | A61B 5/4528 |
| | | | | 600/595 |
| 2006/0098865 | A1* | 5/2006 | Yang | G06V 40/10 |
| | | | | 382/159 |
| 2006/0217945 | A1* | 9/2006 | Leprevost | G06F 17/11 |
| | | | | 703/2 |
| 2006/0274068 | A1* | 12/2006 | Barthelet | G06T 13/40 |
| | | | | 345/473 |
| 2007/0083290 | A1* | 4/2007 | Nagasaka | B25J 9/1671 |
| | | | | 318/568.11 |
| 2007/0146371 | A1* | 6/2007 | Dariush | G06T 7/251 |
| | | | | 345/473 |
| 2009/0091575 | A1* | 4/2009 | Borac | G06T 13/40 |
| | | | | 345/474 |
| 2009/0228244 | A1* | 9/2009 | Naudet | G06F 30/20 |
| | | | | 703/2 |
| 2010/0152899 | A1* | 6/2010 | Chang | B25J 9/1682 |
| | | | | 700/262 |
| 2012/0150499 | A1* | 6/2012 | Todorov | G06F 30/20 |
| | | | | 703/2 |
| 2020/0327203 | A1* | 10/2020 | Storey | G06F 30/20 |
| 2022/0100928 | A1* | 3/2022 | Storey | G06F 30/20 |
| 2024/0126940 | A1* | 4/2024 | Storey | G06F 30/20 |

OTHER PUBLICATIONS

Carvalho, André, and Afzal Suleman. "Simulation of rigid-body impact using the articulated-body algorithm." Robotica 29, No. 5 (2011): 649-656 (Year: 2011).*

Lefeber, Dirk. "An original O (N) formulation for simulation of robotic systems." Mathematics and Computers in Simulation 41, No. 5-6 (1996): 517-524 (Year: 1996).*

Mirtich, Brian Vincent. Impulse-based dynamic simulation of rigid body systems. University of California, Berkeley, 1996. 259 pages (Year: 1996).*

Authors Unknown, "Middle Recursion", obtained from http://web.archive.org/web/20190122141926/http://euler.vcsu.edu:7000/1363/ on Apr. 28, 2022 as archived on Jan. 22, 2019, 1 page (Year: 2019).*

Hu, Jingchen, and Tianshu Wang. "An efficient high-precision recursive dynamic algorithm for closed-loop multibody systems." International Journal for Numerical Methods in Engineering 118, No. 4 (2019): 181-208 (Year: 2019).*

A. Fijany, I. Sharf and G. M. T. D'Eleuterio, "Parallel O(log N) algorithms for computation of manipulator forward dynamics," in IEEE Transactions on Robotics and Automation, vol. 11, No. 3, pp. 389-400, Jun. 1995, doi: 10.1109/70.388780 (Year: 1995).*

K. Yamane and Y. Nakamura, "Parallel O(log N) Algorithm for Dynamics Simulation of Humanoid Robots," 2006 6th IEEE-RAS International Conference on Humanoid Robots, Genova, Italy, 2006, pp. 554-559, doi: 10.1109/ICHR.2006.321328. (Year: 2006).*

\* cited by examiner

```
SpatialVector solveRecursive(node, parent, parentDeltaVelocity)
{
        SpatialVector childDeltaV = node.propagateVelocity(parentDeltaVelocity);
        SpatialVector childV = node.velocity + childDeltaV;
        SpatialVector parentV = parent.velocity + parentDeltaV;
        SpatialVector childImpulse = zero;
        spatialVector parentImpulse = zero;
        //Below updates childV, parent, childDeltaV, parentDeltaV and records impulses
        solveConstraints(node, parent, childV, parentV, childDeltaV, parentDeltaV, childImpulse, parentImpulse);
        for each (child in node)
        {
                SpatialVector propagatedImpulse = solveRecursive(child, node, childDeltaV);
                childImpulse += propagatedImpulse;
                childDeltaV += node.responseMatrix * propagatedImpulse;
        }
        recordImpulse(childImpulse);
        //Return the impulse acted on the parent (solving internal constraints) plus
        //propagated impulses acting on this child link back up to parent
        return parentImpulse + propagateImpulse(node, childImpulse);
}
```

FIG. 4

INTERNAL SOLVER FOR ARTICULATIONS IN SIMULATION APPLICATIONS

BACKGROUND

Robotics and automation are being used to perform an ever-increasing variety of complicated tasks. In many instances, simulations are performed to ensure that the instructions or programming provided to various automated agents enable those tasks to be performed accurately and safely. For relatively simple systems, such as grippers with few articulated components, this simulation may be able to be performed using conventional approaches with reasonable success. For complicated systems, however, these simulations can be very complex and time-consuming, and the expense of computing the simulations may make such automation cost-prohibitive for various applications.

BRIEF DESCRIPTION OF THE DRAWINGS

Various embodiments in accordance with the present disclosure will be described with reference to the drawings, in which:

FIG. 4 illustrates pseudocode for propagating impulses, according to at least one embodiment;

DETAILED DESCRIPTION

Approaches in accordance with various embodiments utilize a solver that can enable complex simulations to be performed in significantly less time than for conventional systems. In at least one embodiment, such a solver can exploit the structure of an articulation to solve a set of internal constraints, as may relate to limits or drives, as well as to solve at least a subset of external constraints in an efficient and accurate manner. These external constraints can involve, for example, interacting with static and kinematic rigid bodies. Such a solver can perform a simulation operation in an amount of time that is on the order of the number O(N) of links or joints of an agent, with a similar order amount of memory, while producing results that match or exceed those of a much more expensive generic rigid body solver. In at least one embodiment, a solver can operate in O(N) time per iteration regardless of the structure of the articulation. Furthermore, the amount of computation required per link can be significantly reduced in at least one embodiment by exploiting the relationship between the state of a child link and a state of its parent link when performing a depth-first traversal of a hierarchical tree used to represent links of an agent. In addition, in cases where only part of an articulation is actuated or limited, performance can be produced that is better than O(N) by explicitly skipping one or more sub-trees.

In at least one embodiment, a simulation technique can explicitly interleave solving drives, contacts, and limits while descending a tree in a well-defined way that increases the likelihood of all constraints being satisfied in a single iteration. This tree can be descended from root to leaf, with constraints affecting a parent link being solved before constraints affecting a child link. Once the constraints on child links are solved, the forces can be propagated back up the tree and re-projected onto the joint degrees of freedom as they are propagated. This can be used to allow the drive and limit solvers to converge on the correct answer without the need for further iterations. The difference can be exemplified in cases where a traditional iterative solver cannot converge on an answer irrespective of the number of iterations, but an approach in accordance with at least one embodiment can find the answer in a single iteration. It should be noted that some direct solvers could be used to converge on the correct answer in these cases, but these solvers are not scalable and can become unstable in ill-conditioned cases. In at least one embodiment, a solver can utilize various iterative algorithms, as may include a projected Gauss-Seidel approach or a temporal Gauss-Seidel approach, as well as a Jacobi approach.

Figure 1A:
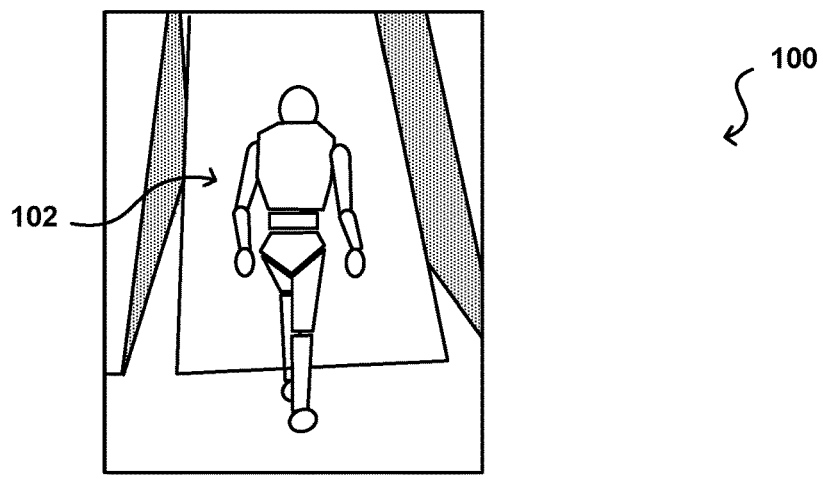
FIGS. 1A, 1B, 1C, and 1D illustrate frames of a simulation that can be performed, according to at least one embodiment.
Figure 1B:
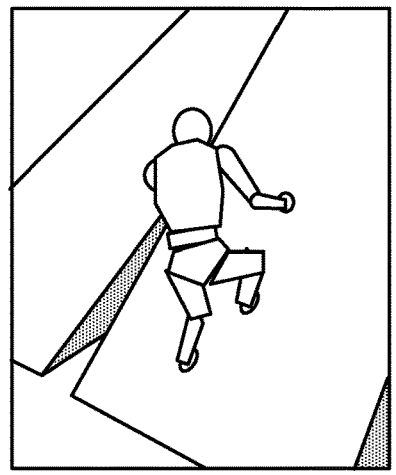
Figure 1C:
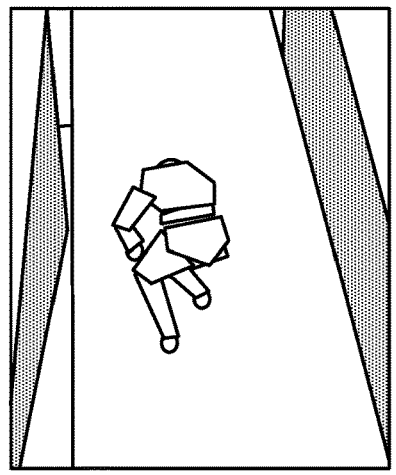
Figure 1D:
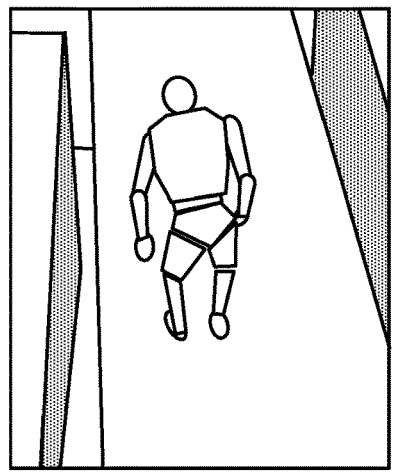

In many instances an automated object such as a robot will need to perform specific tasks, and a simulation can be performed beforehand to ensure accurate performance of that task. This simulation can also take into account various internal or external forces that might be applied to that robot during performance of that task, in order to account for those forces and determine their impact on the robot. For example, a simulated robot 102 illustrated in FIG. 1A might be tasked to scale a wall at a particular angle. In addition to determining motions necessary for that robot to move up the wall, it is necessary to determine external forces that may be applied to any portion of the robot during that task. For example, when climbing this wall, there will be physical forces pushing on the hands and feet of this robot from the wall. In addition to forces due to gravity, the wall may not be smooth such that these forces may impact different links of this robot in different directions, and with different magnitudes in those different directions. In addition to having an impact on the specific link, such as a foot stepping on a rock at a specific angle, there will be a resulting impact on other links of the robot. As the robot performs the task, here scaling the wall, there can be different internal and external forces imparted onto this robot at each stage, such as for each frame of motion simulation illustrated in FIGS. 1A through 1D. In this example, there may be up to four links of this robot in contact with portions of the wall or surface at any time, with resulting forces for each point of contact. These forces all have to be propagated throughout the entire robot simulation at each time step, which can result in a very expensive process. As the system gets more complex, this expense can increase exponentially as discussed herein.

Figure 2:
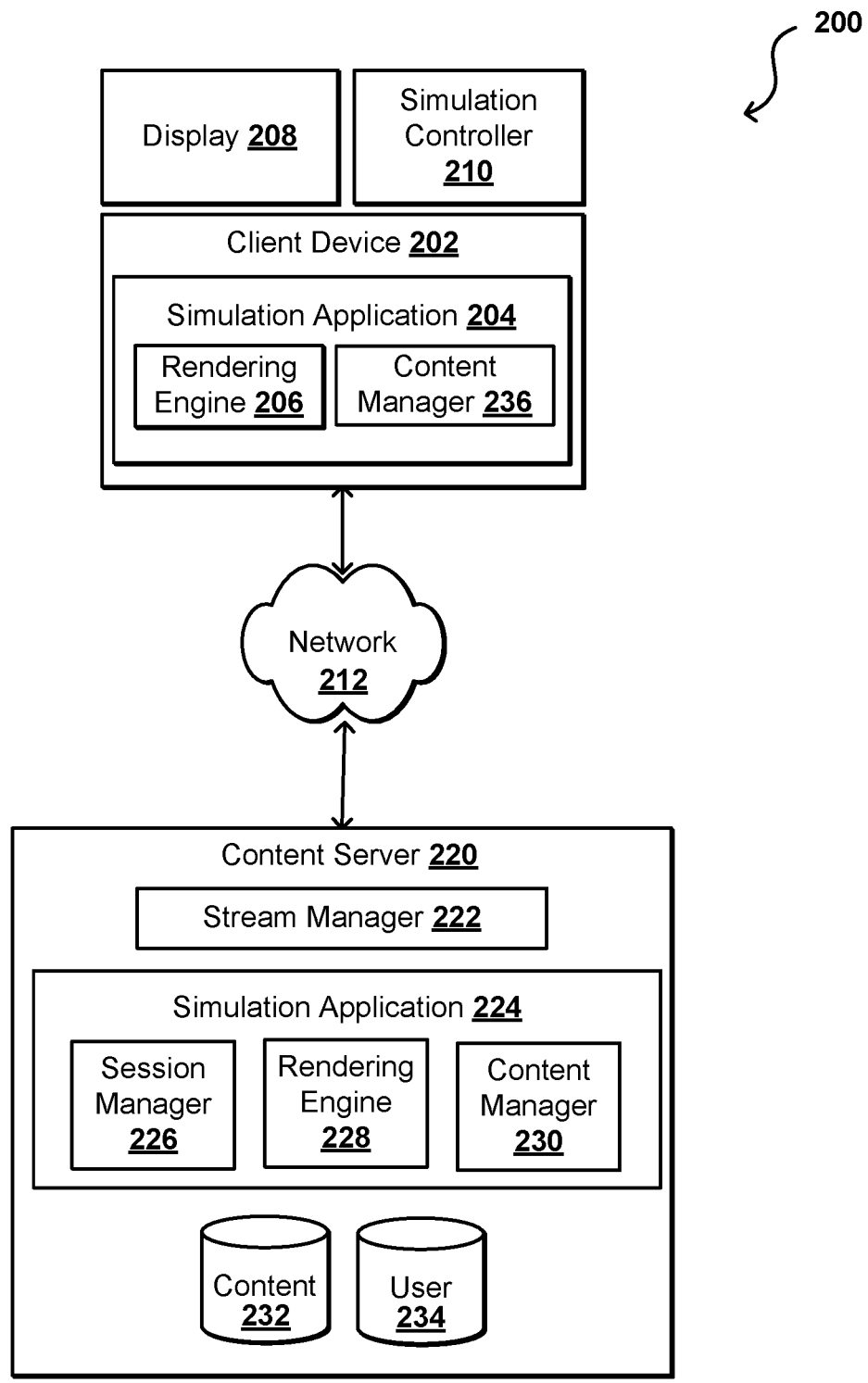
FIG. 2 illustrates an agent simulation architecture, according to at least one embodiment.

A system 200 such as that illustrated in FIG. 2 can be used to perform such a simulation in at accordance with various embodiments. In this example, a client device 202 is used to control a simulation that is, at least partially, executed on a remote content server 220 accessible over at least one network 212. It should be understood, however, that a simulation could be executed on a single computing device or group of computing devices that may not require access to an external network. In this example arrangement, client device 202 may include any appropriate device capable of at least presenting content for a simulation, as may include a desktop computer, notebook computer, set-top box, streaming device, gaming console, smart phone, tablet computer, VR headset, AR goggles, a wearable computer, or a smart television. In at least one embodiment, this content may include content transmitted across at least one network 212 from a content server 220 to a client device 202. In at least one embodiment, a simulation application 224 executing on content server 220 can initiate a session associated with client device 202, using a session manager 226 and user data stored in a user database 234, and can cause simulation content 232 to be rendered using a rendering engine 228, if needed for this type of content, and transmitted to client device 202 using an appropriate stream manager 222. In at least one embodiment, client device 202 receiving this content can provide this content to a simulation application 204, which may also include a rendering engine 206 for rendering content on this device, for presentation via client device 202, such as video content illustrating a state of this simulation through a display 208. In this example a user viewing this simulation using client device 208 can provide input via a simulation controller, whether by a set of instructions for a task to be performed or by input to a physical controller, such as a joystick or control pad. In at least one embodiment, content for this simulation (e.g., a model for a robot or environment) may already be stored on, or accessible to, client device 202 such that transmission over network 212 is not required. In at least one embodiment, a transmission mechanism other than streaming can also be used to transfer this content from server 220, or content database 232, to client device 202.

In at least one embodiment where client device 202 communicates with a remote server, application 224 can include a content manager 230 that can perform a simulation and generate corresponding data or other content (e.g., a graphical view of a current state of simulation) before this content is transmitted to client device 202. Content manager 230 can include various simulation algorithms, rules, code, and other elements used to perform a simulation. In at least one embodiment, content manager 230 can utilize these algorithms and elements to perform tasks such as to determine forces and changes in velocities on various links of an agent in a simulation, where an agent can refer to any controllable object or element for which a simulation is being performed, such as a virtual robot being used to simulate actions and responses of a physical robot. In at least one embodiment, content manager 230 can store graphics, text, models, or other data for a simulation to a content database 232. In various embodiments, this a graphical view of a simulation can be rendered using a rendering engine 228 on server 220 or a rendering engine 206 on client device 202. In at least one embodiment, at least some of this content can be transmitted to client device 202 for display or other presentation. In other embodiments, tasks such as motion simulation and rendering can be performed by application 204 executing on client device 202, among other such options.

Figure 3A:
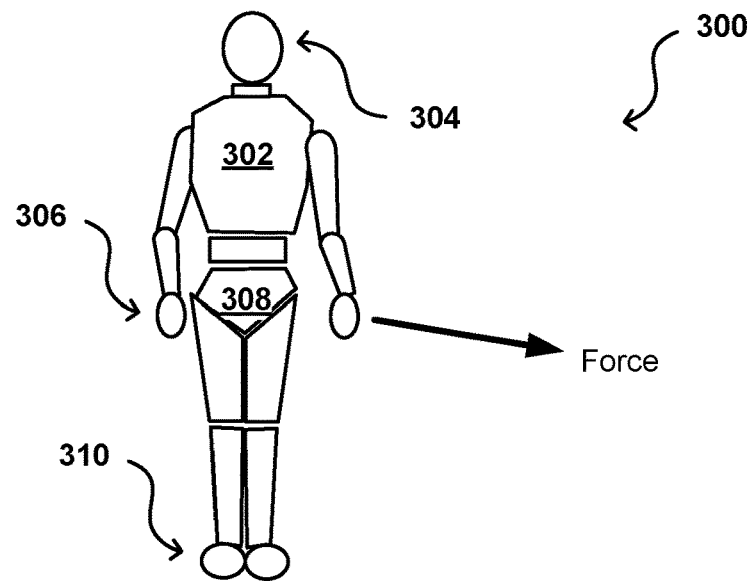
FIGS. 3A and 3B illustrate a node hierarchy for an agent to be simulated, according to at least one embodiment.

In at least one embodiment, such a system can be utilized to perform a simulation of an agent including one or more rigid bodies connected by joints, as may be useful for applications such as robotics. For complex articulation models, such as may include many links, it can be very expensive to perform an accurate simulation due to the need to traverse these links multiple times to determine propagation of forces and velocities. In at least one embodiment, an articulation can be modelled as a hierarchy of links, including a root link or root node from which these other links all descend. Consider an example agent 300 illustrated in FIG. 3A. It should be understood that this is just an example agent, and that many different agents can be simulated which can correspond to different types of controllable objects with different arrangements and numbers of links and joints. It also should be understood that this is a high level overview of this agent showing basic links, and that there may be various other components utilized for a physical agent that are not illustrated in this figure or described in detail herein, but would be apparent to one of ordinary skill in the art in light of the teachings and suggestions contained herein. They can include, without limitation, components, subsystems, and controllers for causing a physical agent to perform instructed actions or tasks. This example agent corresponds generally to a human body, including such components as a torso 302, a head 304, arms, and legs. In a simulation, it is necessary to control these links in a coordinated fashion in order to perform a desired task. If a force is applied to any of these links, such as to a hand in this figure, it can be necessary to determine how that force impacts these various links so that appropriate adjustment can be applied. For example, if this force pulls on that hand, then it can be necessary to determine how that force impacts each of these links to both simulate an overall impact of that force, but also to provide instructions to the relevant links or joints that enable that agent to continue to perform, such as to adjust so that the force does not cause the agent to topple over or otherwise not be able to perform a specific instruction or task.

Figure 3B:
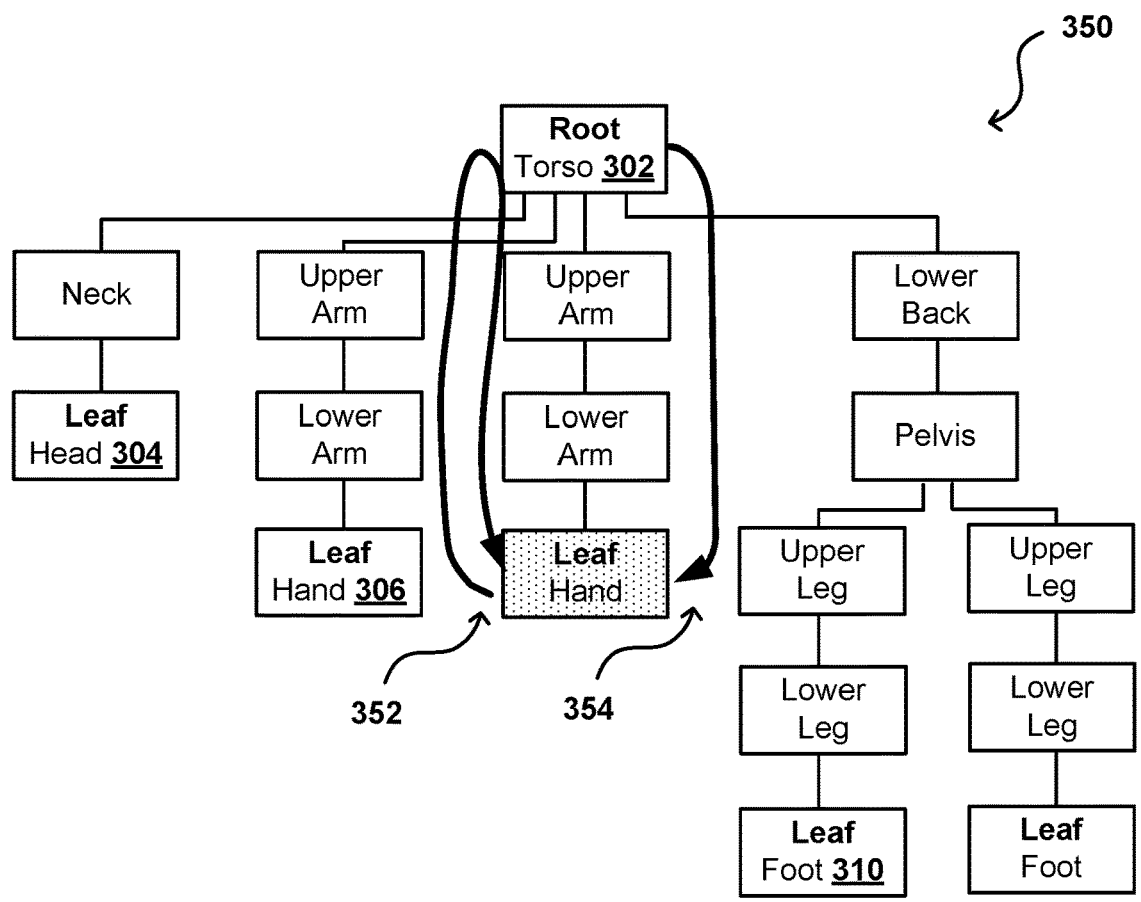

In at least one embodiment, such an assembly of links can be modelled as a link hierarchy 350, as illustrated in FIG. 3B. A node of the tree for one of these links can be designated a root node, where that root node can represent a node from which all other nodes can descend in a hierarchical tree structure 350. For the example agent 300 of FIG. 3A, this can correspond to the torso 302. Portions of this agent connected to the torso, such as the head, arms, and legs, can then each be modelled as a path of descending links, or child nodes, from this root node. Each of these links can have various constraints on movement, and any time a force is applied to one of those links, there can be a resulting impact on all other nodes of that tree. In addition to mass, each rigid body or link can have an associated inertia tensor, which can define how an applied torque affects an angular velocity on that link. A spatial articulated inertia can then be determined for each link. For a leaf node in a hierarchy, such as may correspond to a hand, the spatial articulated inertia can be the same as its original inertia because it has no child links. For parent links, a spatial articulated inertia in this articulation model can be determined using the aggregated mass and inertia of itself and all of its descendant child nodes or links. This inertia can be propagated from the leaf node through the parent nodes and up to the root node, such as a torso of a robot in examples presented herein. As such, the torso or root node contains all of the spatial inertia of every link in this articulated body. The root node then defines how this whole body will move if a force is applied on the torso. For every other link of the body, it only defines how a force will affect its movement relative to its parent.

In prior approaches, a force applied on a node would need to be propagated to the root node, to determine an impact, which would then need to be propagated back down to that node and any leaf nodes along that path, as illustrated by propagation 352 in FIG. 3B. In addition to this propagation for that path, a similar propagation would need to be performed for other paths or branches of this tree. In some situations, to solve the impact of one or more forces on this agent, such propagation of force, acceleration, or torque may need to be performed multiple times. This need to touch each node multiple times can make this calculation very expensive from at least a time and resource standpoint.

Approaches in accordance with various embodiments can instead identify an application of a force on a node of an agent during a simulation, and can calculate a resulting impact on the root node directly rather than having to propagate that force up to the root node through all the various parent nodes along a respective path or branch. Such an approach can avoid repeated visiting back and forth between the root link and other links of the articulation to perform all necessary mathematical calculations. Instead of walking through this entire structure repeatedly, approaches in accordance with at least some embodiments can pre-calculate some of these values that can be stored with, or for, the individual links that can enable the remaining calculations to be performed in constant time for any particular link.

Acceleration in various embodiments can be provided through use of an acceleration matrix, or a recursively-defined "response matrix." In at least one embodiment, this response matrix can be a 6×6 matrix, corresponding to three degrees of possible force application (e.g., in x, y, and z) and three degrees of possible torque application (e.g., around x, y, and z). In at least one embodiment, a response matrix can be pre-computed for each link of an articulation, which expresses the acceleration (or change in velocity) caused by an arbitrary spatial force acting on the articulation link. In other embodiments, a matrix can be pre-computed for each joint or other such element of an articulation. When an impulse is applied to a link, the corresponding six spatial forces are propagated to the parent link, where they are multiplied by that parent's spatial response matrix. The resulting change in velocity can then be propagated back down to that child link, as illustrated in propagation 354 of FIG. 3B. These response matrices can be solved recursively from root to leaf node while only visiting each hierarchical node or link once.

In at least one embodiment, such a simulation can then start at the root node and recursively traverse a hierarchical tree structure through all the child nodes to the leaf nodes, visiting each node only once. At each node, starting at the root node and using the pre-computed response matrices, internal constraints and any external constraints are solved to determine the set of impulses and resulting change in velocity on the child link. Once the change in velocity is determined for a link, the process can move to the next child link (down to a leaf node), where another determination can be made. This recursive process is repeated until all nodes have been visited and all changes in velocity determined.

In at least one embodiment, such an approach can be used to solve a full set of constraints acting on an articulation in an amount of time on the order of the number of links $O(N)$ per solver iteration. As mentioned, conventional real-time constraint solvers are generally implemented as iteratively converging algorithms, which may require an amount of time on the order of a square of the number of nodes $O(N^2)$.

In at least one embodiment, a solver recursively traverses the articulation for each iteration, computing the forces from the set of constraints acting on the articulation link. These constraints can relate to, for example, various limits, drives, friction, and external contacts or joints. The response matrix can be used to compute the effect of these forces on the velocity of the link and its children without needing to propagate throughout the tree each time a force is computed. This enables computation of localized velocity changes to a subset of the articulation without needing to update the entire articulation, allowing each branch of this tree to be treated as a self-contained unit. When a leaf node is reached, forces acting on that leaf node are recursively propagated back up the tree and accumulated with those acting on its parent as part of the unwinding process of the recursive call. Other children can be visited at this point and, once all branches at this node have been recursed, the sum of its forces is propagated back to its parent and so on until the entire tree has been processed. A final result can then be identical to a result that would have been produced using a more conventional approach but found in $O(N)$ time, instead of $O(N^2)$ if implemented naively and best-case $O(N\log N)$, worst-case $O(N^2)$ if implemented using a commonly-used deferred force strategy.

Such an approach can be used as an implementation of the Featherstone articulated body algorithm (ABA), which allows for the efficient simulation of a collection of rigid bodies connected by joints. This algorithm represents the system of bodies in hierarchically using a reduced (or generalized) coordinate system. In at least one embodiment, each articulation can have one root link, which can be either free or fixed. The state of this link is defined in a world coordinate frame. States of all other links in this articulation can be defined relative to their parent. An advantage of this approach stems mainly from the forward dynamics of this model being well-defined, guaranteed to be error free, being computationally efficient and closely matching analytical models for kinematic trees commonly used in robotics theory. As it closely matches analytical models, it is possible to also express inverse dynamics for this model in a closed form and explicitly calculate joint actuation torques required to satisfy certain requirements without the need for a complex linear solver. While it is possible to compute actuation forces using inverse dynamics, this model does not natively provide mechanisms to simulate features like joint limits, contacts and other constraints acting on the model like joint stiffness, damping or friction.

In at least one embodiment, these features can be achieved using a linear solver to solve a set of constraints acting on a given model. Several classes of linear solver can be used, ranging from simple iterative penalty force methods, iterative methods based on Lagrange multipliers, direct matrix solvers etc. Approaches in accordance with various embodiments can utilize an impulse-based iterative solver using Lagrange multipliers. Using this kind of solver, the set of constraints can be iterated over multiple times. Each time a constraint is iterated over, the kinematic state of the constrained bodies are projected onto the constraint's Jacobians, a Lagrange multiplier is computed required to satisfy the constraint, and an equal and opposing impulse is applied to both bodies. Such an approach allows for easy coupling of rigid bodies and articulation links. In at least some embodiments, however, it must be possible to measure an effective mass of the body with respect to the constraint, project the velocity of the body onto the constraint, and apply an impulse to update the velocity of the body.

When dealing with a simple rigid body, computing the velocity of that body is a trivial O(1) operation, involving reading the velocity of the body. Similarly, applying an impulse is a simple O(1) operation, involving multiplying the linear impulse by the body's inverse mass and the angular inverse by the body's inverse inertia tensor, and adding this change to the body's velocity. If the impulse direction is known ahead of time, a delta velocity vector can be pre-computed that can then be scaled by the Lagrange multiplier and added to the body's velocity, which avoids the need for multiplication with the inverse inertia tensor matrix.

When dealing with articulations, this problem can become much more expensive. The velocity of a given link can be declared relative to the velocity of its parent, which is in turn relative to its parent. This extends up to the root link of the articulation, or the root node of the hierarchy 350 as illustrated in FIG. 3B. Retrieving the velocity of a link then becomes a linear time operation, where the cost is proportional to the number of links between the link being queried and the root of the articulation. Furthermore, applying an impulse to the link requires propagating that impulse from the link it was applied to the root, and then propagating the corresponding change in velocities to all links in the articulation. This is also an O(N) operation, where N is the total number of links in the tree. This can be accelerated slightly through use of a deferred impulse vector. Through this vector, it is possible to avoid propagating the velocity change to all links when applying impulse, and instead performing this velocity change in an on-demand way inside the constraint solver when querying the velocity of a given link. In many instances the overhead of computing link velocities and propagating impulses in articulations is significantly higher than the cost of solving contacts, joint limits etc., which are generally computationally inexpensive.

An approach in accordance with various embodiments can utilize a set of operations that act on articulations. A first operation, referred to herein as PropagateForce, can be used to propagate a spatial force (containing both force and torque) from a link to its parent. This computes the joint forces acting on the current link and propagates the remaining forces to the parent link. Another operation, referred to herein as PropagateAcceleration, takes an acceleration acting on the parent link and propagates this acceleration to the child link. This operation factors in the joint forces computed during the PropagateForce stage to compute the total joint acceleration caused by the parent's acceleration and the joint forces currently acting on the child link. With these two operations, coupled with a computed spatial articulated inverse inertia for the root link, it is possible to compute the changes in acceleration caused by spatial forces acting on any link in the articulation. For the purposes of the internal solver, impulses and changes in velocity will be discussed rather than forces and accelerations. The concepts are related, as when using Euler integrators an impulse is the equivalent of a force*df and a change in velocity is equivalent to an acceleration*dt. Therefore, an approach to propagate forces and compute accelerations within an articulation can also be used to propagate impulses and compute velocity changes within the articulation. Thus, a description of this algorithm may refer to operations as "PropagateImpulse" and "Propagate Velocity", which are mathematically equivalent to PropagateForce and PropagateAcceleration.

With a traditional Featherstone articulation approach, accelerations acting on a link can be computed by propagating the forces from the link they are acting on to the root of the articulation, and then propagating the accelerations back from the root link to all links on the articulation. This is an O(N) operation. This operation can be required not only to apply forces on the articulation, but also to compute the effective mass of the articulation with respect to a constraint in order to compute the required forces to satisfy this constraint. It is possible to compute a 6×6 response matrix for each link of the articulation, which expresses the acceleration caused by an arbitrary spatial force acting on the articulation link. For the root link, this is the exact same matrix as the spatial articulated inverse inertia. In at least one embodiment, this response matrix can be computed for an arbitrary link i by propagating six unit spatial forces corresponding with the six world-space degrees of freedom, including linear (x, y, z) and angular (x,y,z), respectively to the root link and propagating the acceleration caused by these forces back to the link in question. The spatial vector that each of these propagations produces corresponds to a row in the response matrix. This is naively an O(N) operation per link. However, it is possible to compute the entire set of matrices for all links in O(N) by exploiting the recursive properties of the articulation. To compute the response matrix for link i, an approach can be to only propagate the six spatial forces to the parent link, multiply these by the spatial response matrix of the parent link, and then propagate that acceleration to the child link. Provided the response matrix is computed from root to tip, this matrix can be computed in O(N) time rather than O(N$^2$) time.

In robotics applications, there can be several constraints per link in an articulation. These can include, without limitation, a PD (proportional plus derivative) controller drive, joint limits, and contacts. Under such circumstances, an iterative solver would need to compute the velocity of a link multiple times and also propagate multiple impulses throughout the articulation for each link. Each of these operations is O(N) worst case. Instead, approaches in accordance with various embodiment provide an optimization that performs a single pass over the entire articulation to solve all internal constraints (e.g., joint limits, drives, joint friction) and additionally solve all one-way contacts, such as may include those against either static or kinematic bodies. During this pass, each link in the articulation is visited once, and velocity and impulse propagation is accelerated using a combination of a deferred joint force (or impulse) buffer and a pre-computed spatial response matrix for each link. This response matrix can be computed recursively in O(N) time. This response matrix can also be used to accelerate computation of the effective mass of the articulations, which is also required for Lagrangian solvers.

Using a response matrix as an acceleration structure provides a well-defined way to compute a velocity change, caused by an impulse, at any specific link without needing to traverse the entire articulation again. Using this information, a multi-constraint solver can be constructed that can traverse that articulation in a depth-first traversal and can solve all constraints acting on each link, propagating those velocity changes to its children and, when the recursion is unwound, propagating the impulses acting on child links back up to the parent. This entire process can be performed in O(N) time, where N is the number of links. Example pseudocode 400 for such an algorithm is illustrated in FIG. 4. This example implementation is recursive for sake of simplicity. This algorithm involves recursively traversing the tree from root to children. At each node, internal constraints acting between the parent and child links (e.g., joint limits, drives, joint friction) are solved. Additionally, any external contacts or joints with static bodies acting on the child link are also solved. This produces a set of impulses acting on the child and parent link. In addition, the changes in velocity that these operations would cause on the child link are computed. This process can then recursively visit each of the child link's children and solve the internal constraints etc. on those links. When the recursive step completes, the forces acting on the link are propagated back to it, allowing the link's velocity to be updated before visiting its next child link, if there are more along that path or branch of the hierarchy. When all child links have been recursively visited, the impulses acting on the parent link are returned by adding the impulses that were applied on the parent link when solving internal constraints with the propagated impulses caused by propagating the aggregated impulses acting on the child link. This approach is able to visit each link exactly once and incurs O(N) time complexity.

Such a solver can be very efficient and well-suited to both central processing unit (CPU) and graphics processing unit (GPU)-based implementation. Such a solver can provide performance that is in excess of 2× faster than generic solvers when simulating common robotics problems, as may include on the order of about 10 links), and can provide performance orders of magnitude faster when the complexity of the articulation is higher, such as may involve 50 links or more. Such a solver can provide good results, can fit well into an existing rigid body solver framework, and does not exhibit degenerate failure cases.

Figure 5:
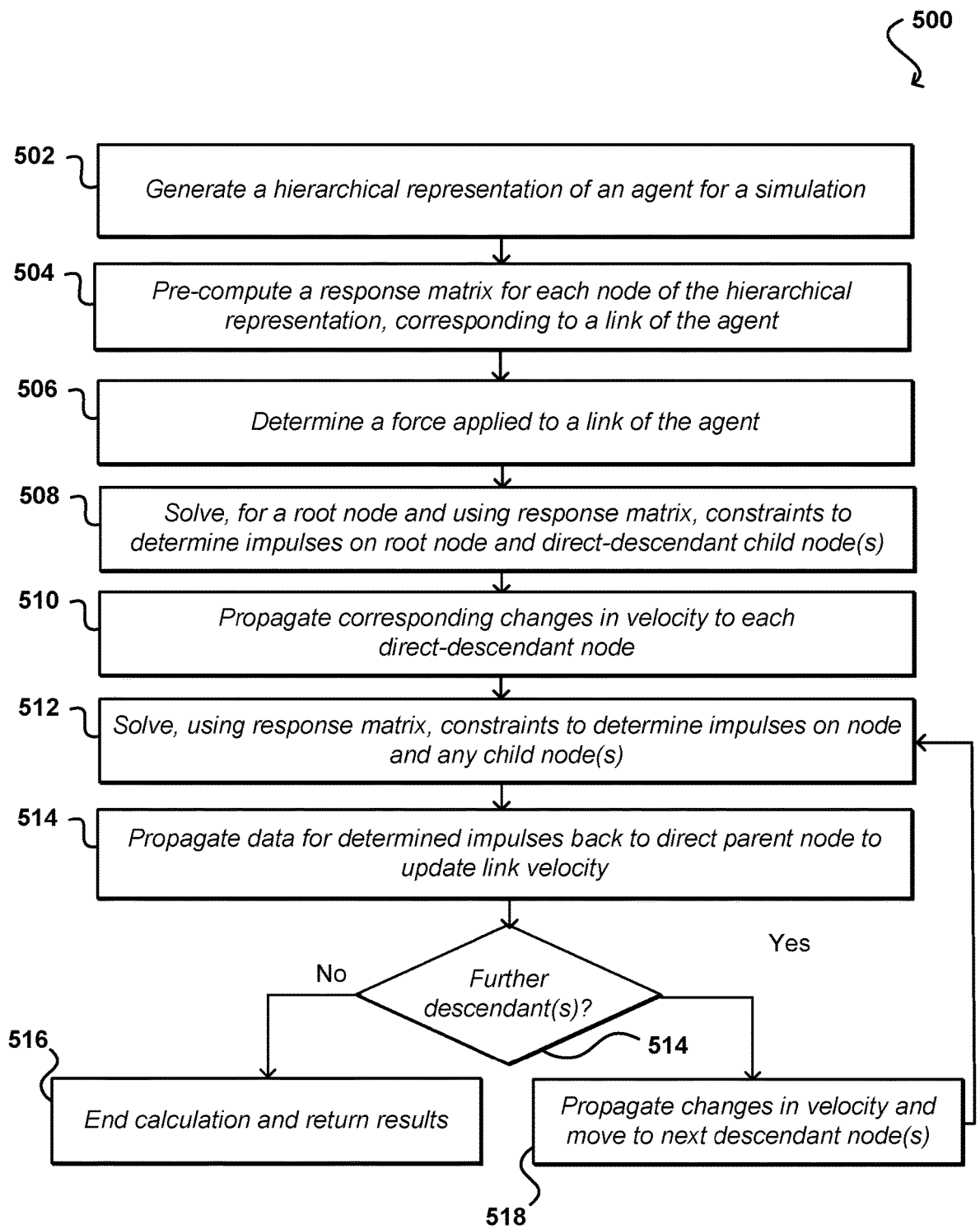
FIG. 5 illustrates a process for determining an impact of an applied force on an agent in a simulation, according to at least one embodiment.

FIG. 5 illustrates an example process 500 for determining an impact of an applied force on an agent in a simulation that can be utilized in accordance with various embodiments. It should be understood for this and other processes discussed herein that there can be additional, alternative, or fewer steps performed in similar or at least partially alternative orders, or in parallel, within the scope of the various embodiments unless otherwise stated. In this example, a hierarchical representation of an agent for a simulation is generated 502, such as where each node of the representation corresponds to a link or joint of an articulation. A response matrix can be pre-computed 504 for each node of this hierarchical representation. In at least one embodiment, this can be a 6×6 matrix, corresponding to three degrees of possible force application (e.g., in x, y, and z) and three degrees of possible torque application (e.g., around x, y, and z). In at least one embodiment, each response matrix can be used to express the acceleration (or change in velocity) caused by an arbitrary spatial force acting on the corresponding articulation link.

In this example, a force or impulse is determined 506 that is applied to a link of the agent. Starting at a root node of the structure for this agent, one or more constraints can be solved 508 using a response matrix for the node to determine impulses on that root node, as well as for direct-descendant child nodes of the hierarchical structure. This can include solving for internal constraints acting between the parent and child links (e.g., joint limits, drives, joint friction), as well as for any external contacts or joints with static bodies acting on a child link. In at least one embodiment, changes in velocity are computed for any child node(s) that these operations would cause on these child links. These calculated changes in velocity can be propagated 510 to the respective direct-descendant child nodes. Using the response matrices for these nodes, the constraints can be solved 512 to determine impulses on these nodes and any next descendant child nodes. Data for these determined impulses can be propagated 514 back up to the direct parent node in order to update the link velocity corresponding to that node. This process can continue recursively from the root node to each child node of this hierarchical structure. A determination can be made 514 as to whether there are more child nodes to visit, and if so, then the computed changes in velocity can be propagated 518 to those child nodes and the process can move on to those nodes to perform the next recursive calculation. If there are no further descendants, such as where all child links have been recursively visited, the calculation can be ended 516 and the results of this step of the simulation returned. As mentioned, this approach is able to visit each link, or node of the hierarchy, exactly once and incurs O(N) time complexity, while more commonly-used general solver approaches have time complexities of O(N$^2$) or worse.

Figure 6:
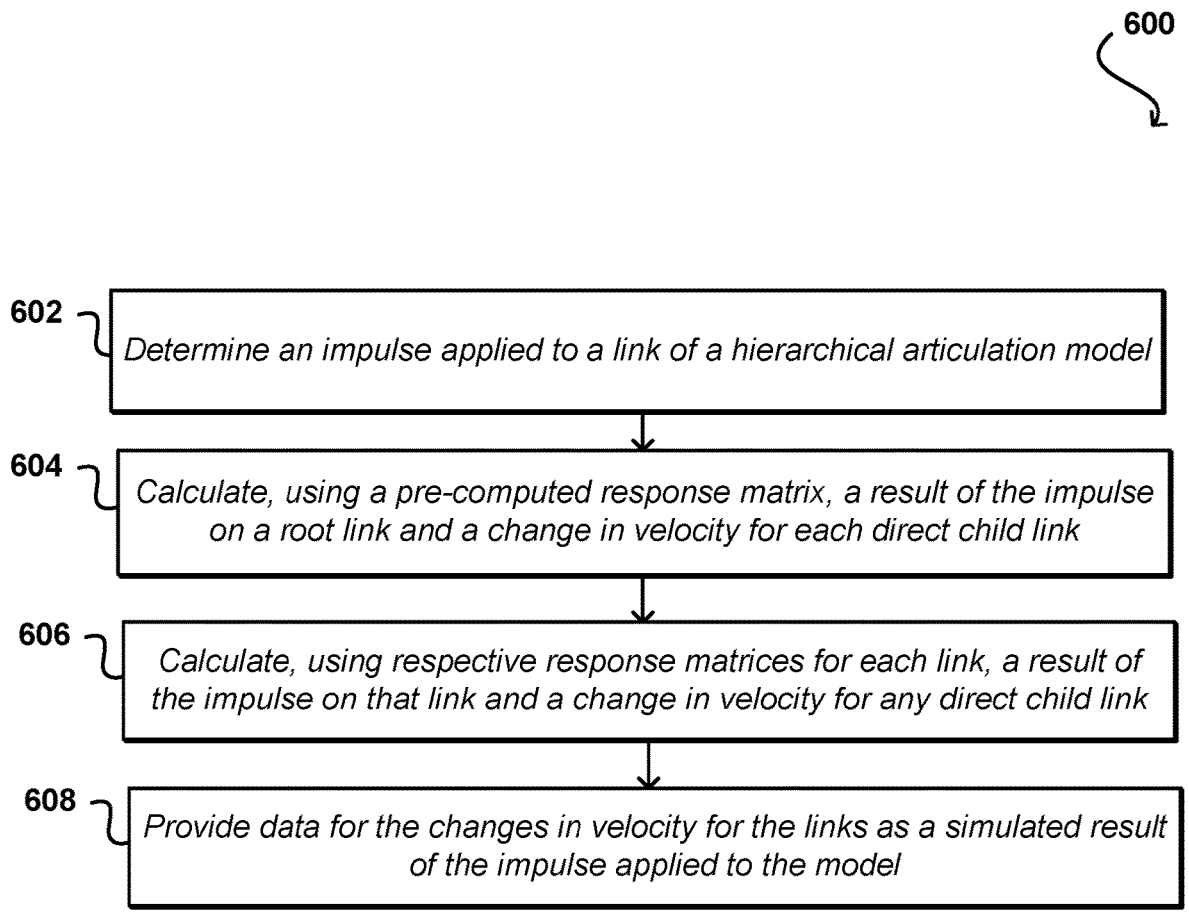
FIG. 6 illustrates a process for simulating an impact of an impulse on an agent in a simulation, according to at least one embodiment.

In at least one embodiment, a process 600 illustrated in FIG. 6 can be used to determine an impact of an impulse on a simulated agent. In this example, an impulse applied to a link of a hierarchical articulation model can be determined 602. This impulse can be applied to any link of the model, from a root link to a leaf link, where each link corresponds to a node of the hierarchy. Using a pre-computed response matrix for a root link, a result of the impulse on the root link can be calculated 604, as well as a resulting change in velocity for each direct child link. Once calculations for this root link are performed, this process can continue recursively for each link of this hierarchical structure, from the root link down to each leaf link, with each link only visited once in this process for a given impact determination. For each non-root link, a respective response matrix for that link can be used to calculate 606 a result or impact of that impulse for that link, as well as a change in velocity for each child link (unless this link is a child link and there are no further children). Data for these changes in velocity for each link can then be provided 608 as a simulated result of the impulse applied to this model.

Inference and Training Logic

Figure 7A:
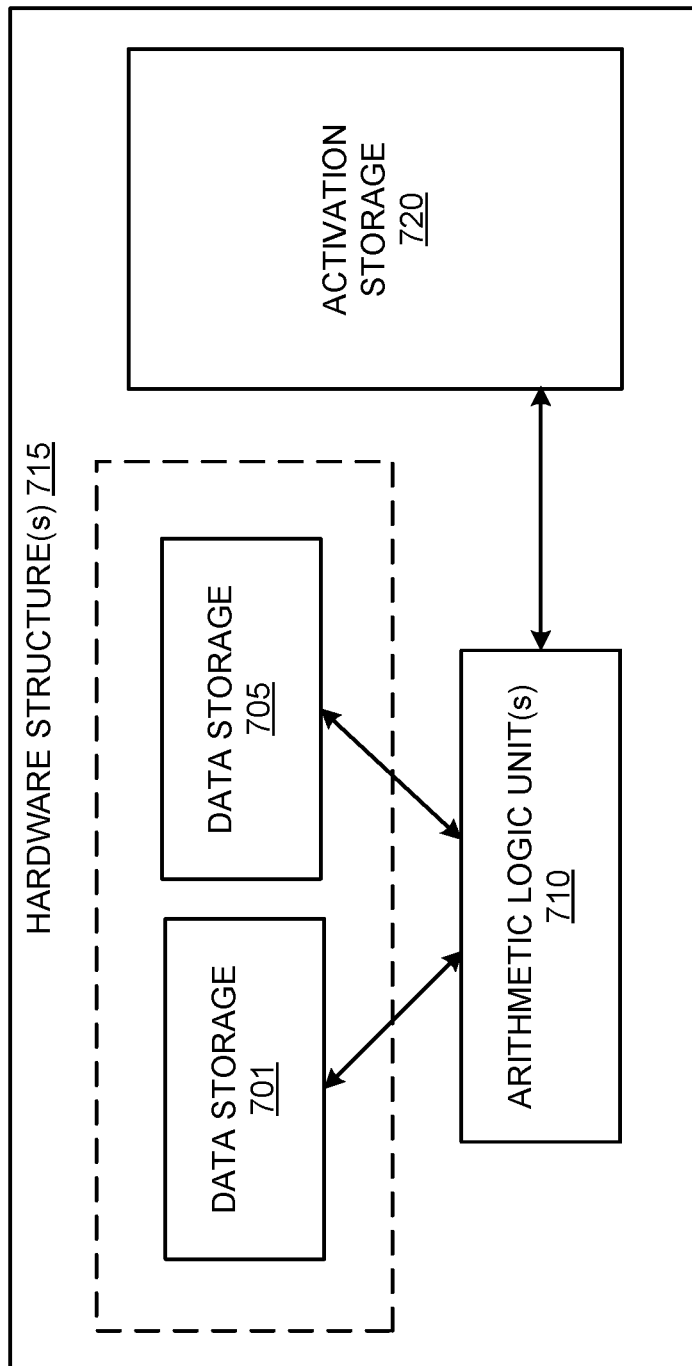
FIG. 7A illustrates inference and/or training logic, according to at least one embodiment.

FIG. 7a illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
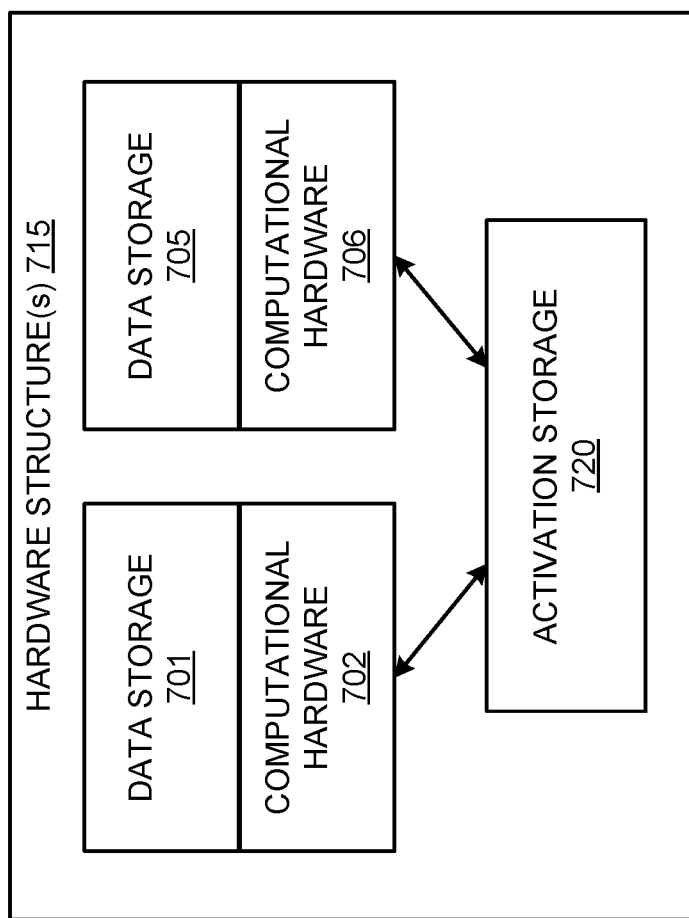
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
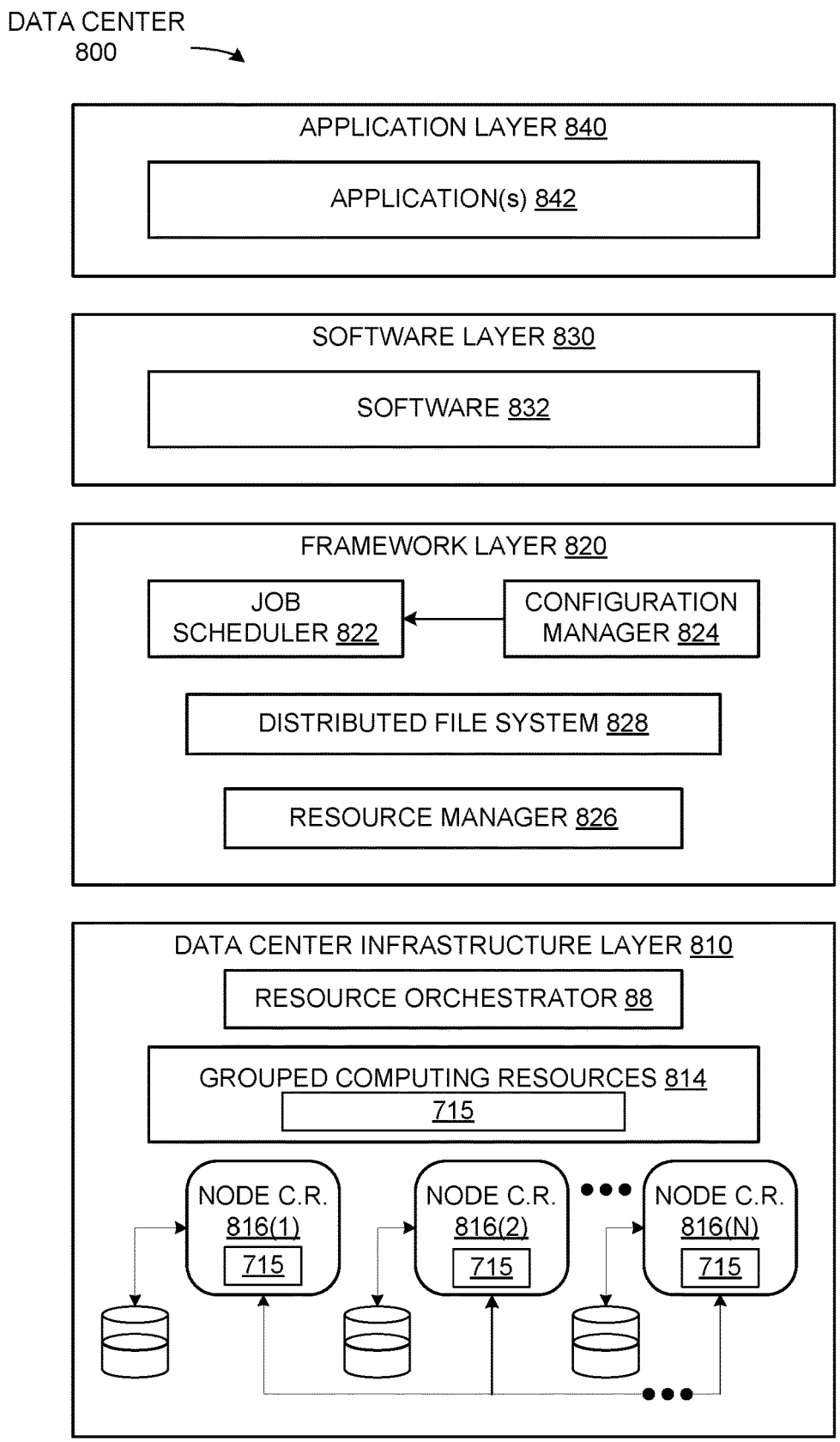
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to perform a simulation for an agent. This can include using a pre-computed response matrix for each link or joint of the agent, and solving this response matrix recursively from a root link down to root links of a hierarchical agent structure.

Computer Systems

Figure 9:
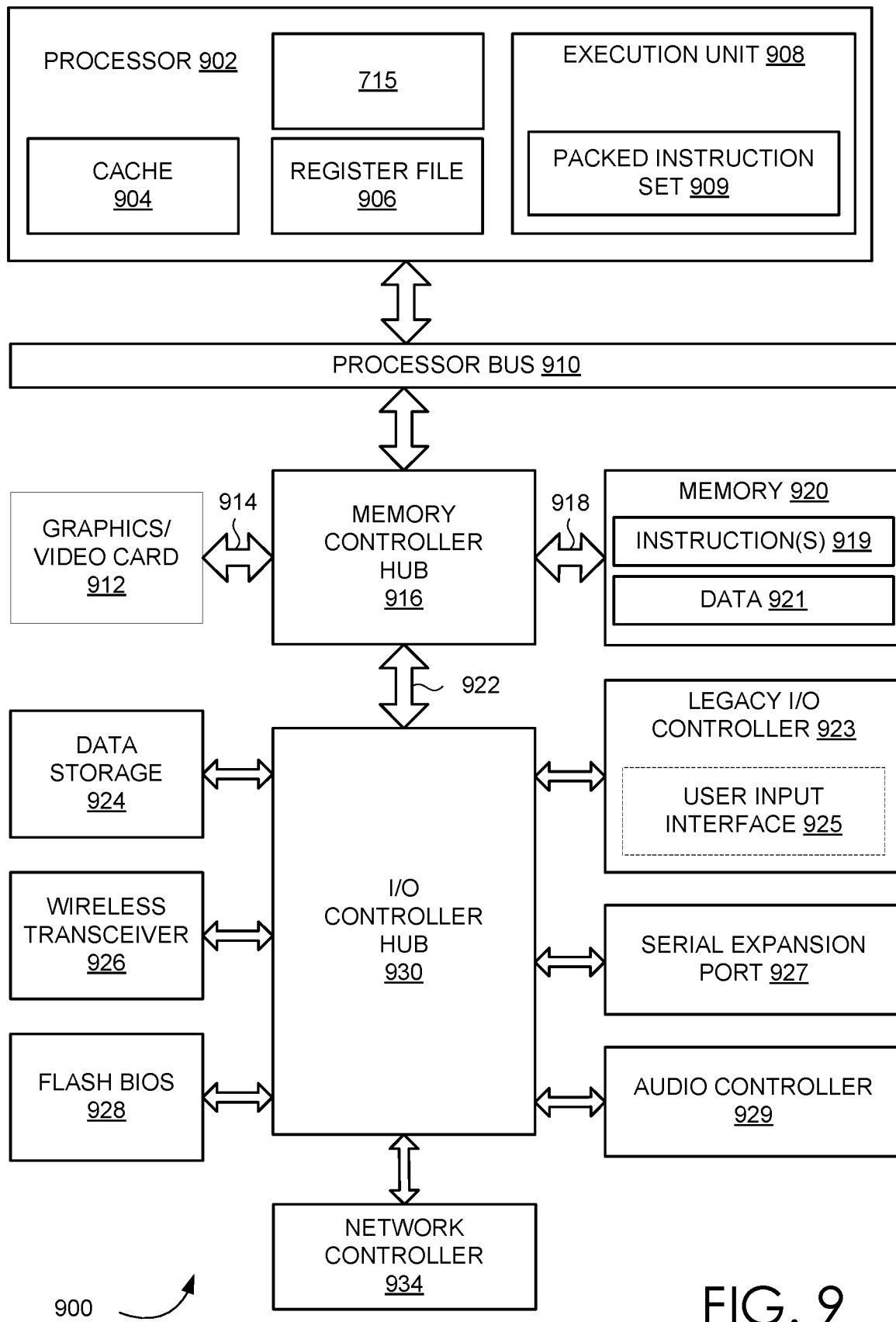
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to perform a simulation for an agent. This can include using a pre-computed response matrix for each link or joint of the agent, and solving this response matrix recursively from a root link down to root links of a hierarchical agent structure.

Figure 10:
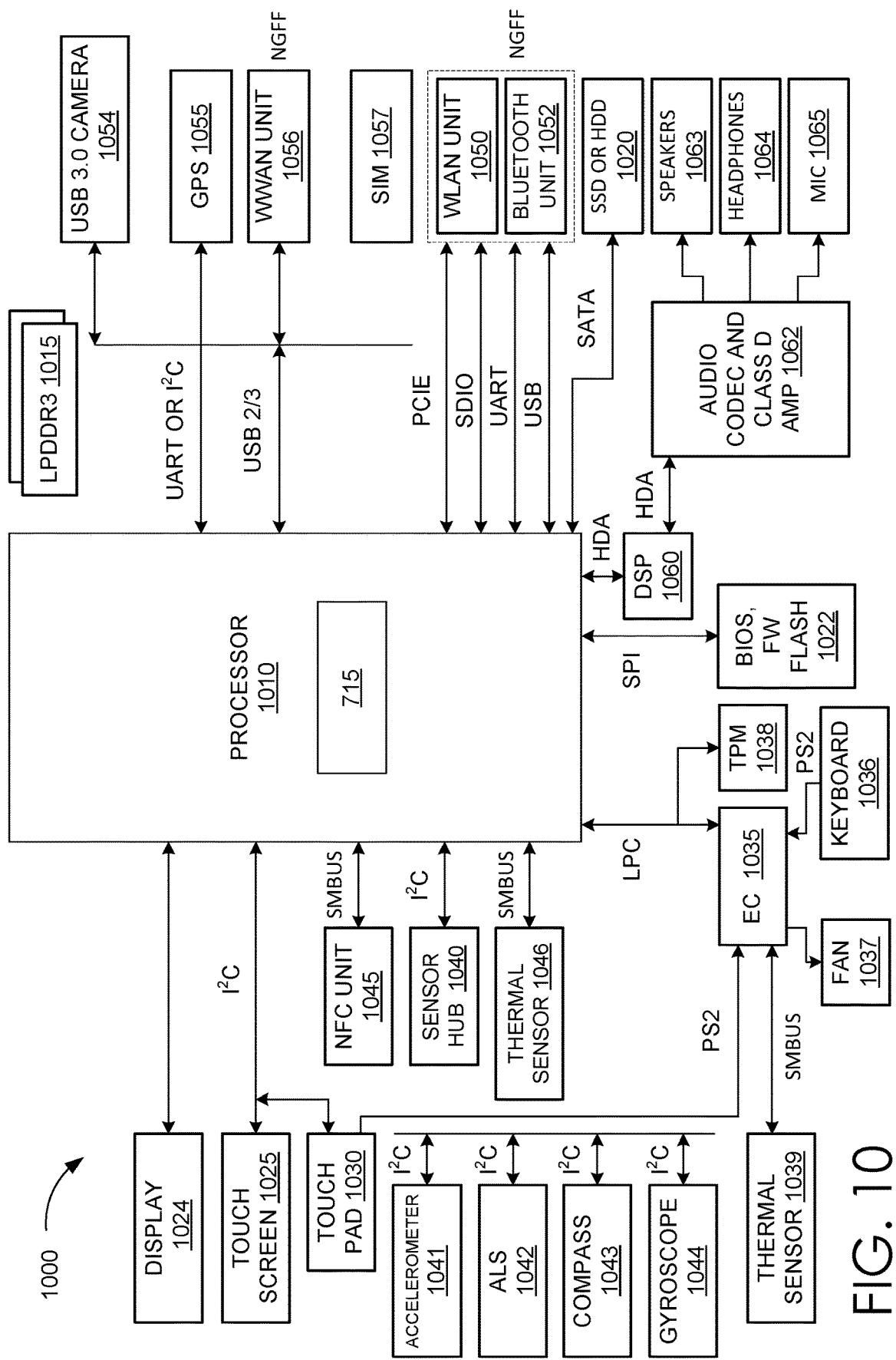
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to perform a simulation for an agent. This can include using a pre-computed response matrix for each link or joint of the agent, and solving this response matrix recursively from a root link down to root links of a hierarchical agent structure.

Figure 11:
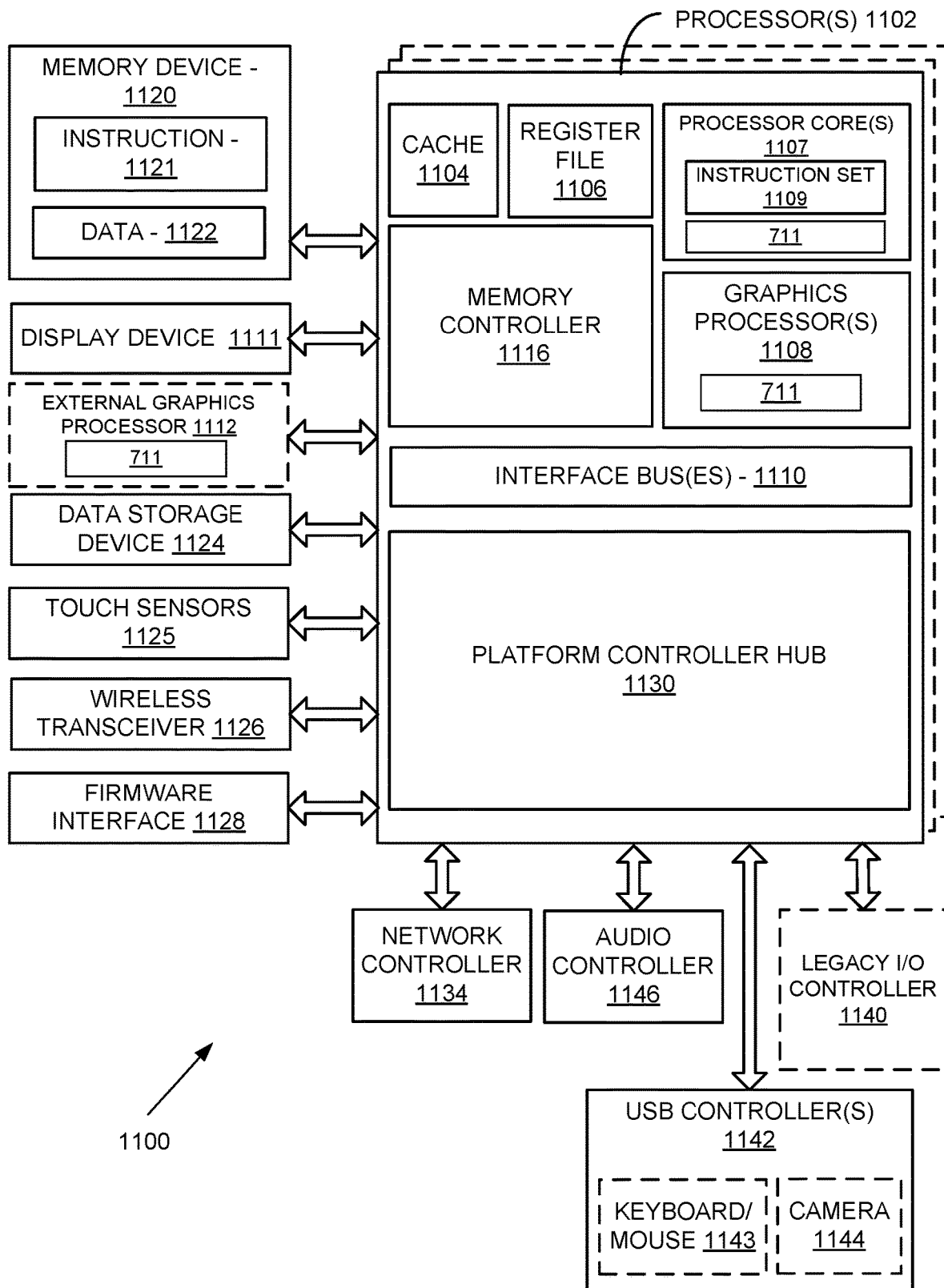
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to: a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to perform a simulation for an agent. This can include using a pre-computed response matrix for each link or joint of the agent, and solving this response matrix recursively from a root link down to root links of a hierarchical agent structure.

Figure 12:
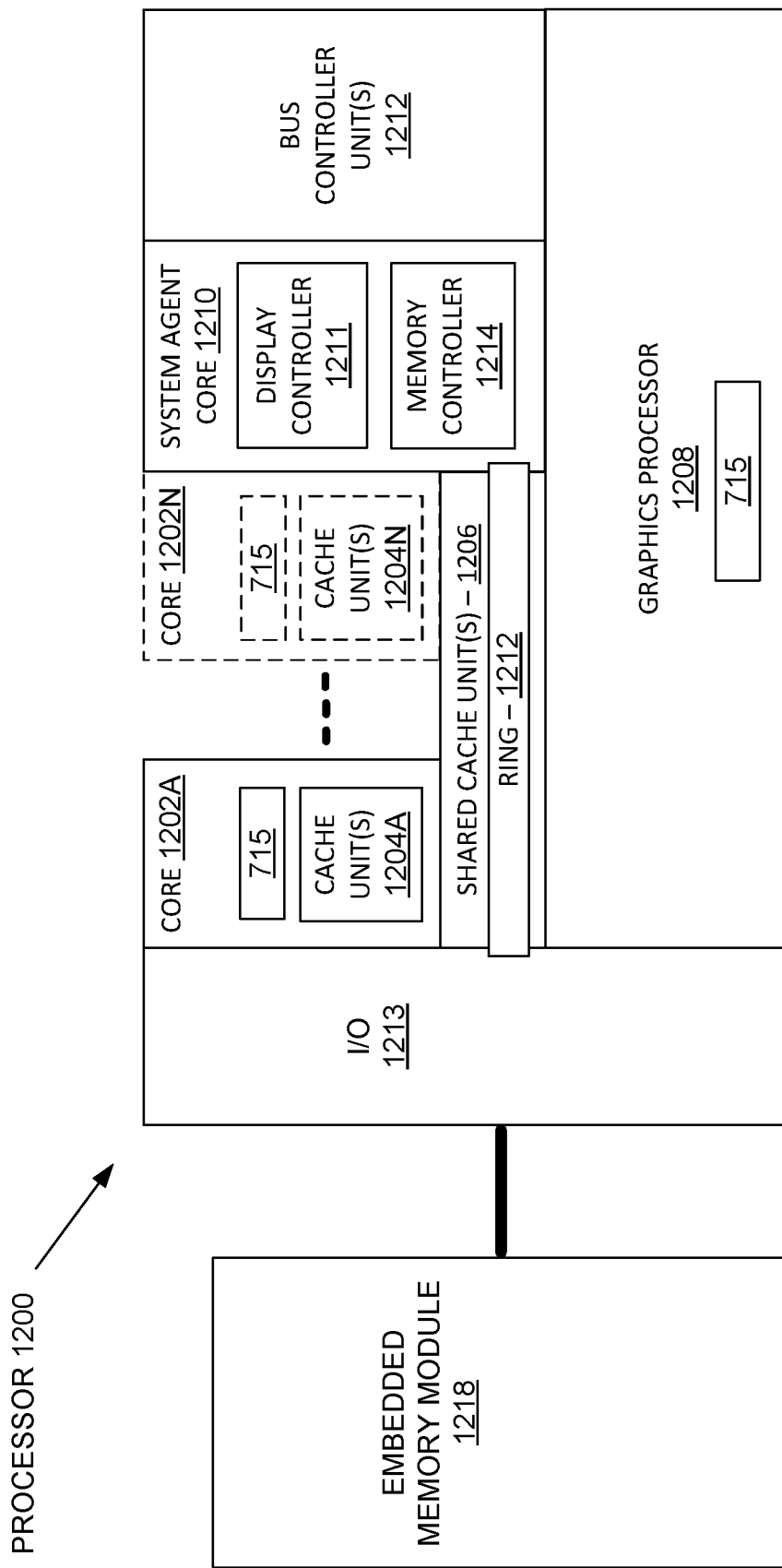
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to perform a simulation for an agent. This can include using a pre-computed response matrix for each link or joint of the agent, and solving this response matrix recursively from a root link down to root links of a hierarchical agent representation.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
determining a force applied to an identified link of an articulation model corresponding to an object rendered on a display, the articulation model having a root node and a plurality of child nodes along two or more paths of a node hierarchy, the child nodes corresponding to articulation links with zero or more degrees of freedom of motion;
computing a respective recursively defined response matrix for each node of the articulation model, wherein the response matrix for the root node is a spatial articulated inverse inertia matrix and the response matrix for each child node is computed by propagating spatial forces to the root node and multiplying by the spatial response matrix of the root node;
storing the response matrix for each node to be available for use in one or more subsequent calculations without recalculation;
calculating, using the response matrix for each node and based on a single pass along each of the two or more paths, a result of the force on the root node and a respective change in velocity for each direct child node of that root node, wherein a set of constraints of the articulation model is solved in the single pass by visiting each child node once using the response matrix, wherein the constraints affecting a parent node are to be solved prior to the constraints affecting a child node in the single pass, wherein localized velocity changes are to be computed using a subset of the articulation model without an update of an entirety of the articulation model;

calculating, based on the single passes and using respective response matrices for individual nodes of the node hierarchy other than the root node, a respective change in velocity of a direct descendant child node of a respective individual node based at least in part upon a respective change in velocity determined for the respective individual node from a direct parent node of the respective individual node;

providing respective changes in velocity for the articulation links as a simulated result of the force applied to the articulation model; and applying the respective changes in velocity to the corresponding articulation links of the object rendered on the display, the respective changes in velocity being represented as movement of the object in accordance with the changes in velocity.

2. The computer-implemented method of claim 1, wherein the response matrices are used to solve a set of constraints for the articulation model in an amount of time that is proportional to a number of articulation links of the articulation model.

3. The computer-implemented method of claim 1, further comprising:
computing the respective response matrices for the root node and the child nodes before determining the force applied to the identified link, each response matrix being a recursively-defined matrix representing a change in velocity resulting from a spatial force applied to the corresponding articulation link.

4. The computer-implemented method of claim 3, wherein the response matrices are 6×6 matrices corresponding to three degrees of potential force application and three degrees of potential torque application.

5. The computer-implemented method of claim 1, wherein the respective changes in velocity are calculated using only one calculation pass for each node in the node hierarchy.

6. The computer-implemented method of claim 1, wherein the result of the force is calculated using a dedicated solver for recursively solving for constraints from a root node to each child node of the node hierarchy.

7. The computer-implemented method of claim 6, wherein the constraints include one or more internal or external constraints relating to a limit, a drive, friction, a static interaction, or a kinematic interaction.

8. The computer-implemented method of claim 6, wherein the solver utilizes an iterative algorithm based on a projected Gauss-Seidel approach, a temporal Gauss-Seidel approach, or a Jacobi approach.

9. The computer-implemented method of claim 1, wherein the articulation model is provided as part of a simulation of a physical agent, the simulation being based at least in part upon a Featherstone articulated body algorithm (ABA).

10. An articulation simulation system, comprising:
one or more processors; and
memory including instructions that, when executed by the one or more processors, cause the articulation simulation system to:
determine a respective response matrix for each link of a hierarchical articulation model associated with an object to be rendered on a display, the hierarchical articulation model consisting of a root link and a plurality of child links, wherein the response matrix is computed using an arbitrary spatial force applied to the root link and the response matrix for the root link is a spatial articulated inverse inertia matrix;
determine a virtual force applied to a specified link of the hierarchical articulation model;
compute a response matrix for each link of the articulation model, wherein the response matrix for the root link is a spatial articulated inverse inertia matrix and the response matrix for each child link is computed by propagating spatial forces to the root link and multiplying by the spatial response matrix of the root link;
store the response matrix for each node to be available for use in one or more subsequent calculations without recalculation;
calculate, using the response matrix and based on a single pass along each child link of the plurality of child links, an impact of the virtual force on the root link and a corresponding change in velocity for each direct child link of the root link, wherein a set of constraints of the articulation model is solved in the single pass by visiting each child link once using the response matrix, wherein the constraints affecting a parent node are to be solved prior to the constraints affecting a child node in the single pass, wherein localized velocity changes are to be computed using a subset of the articulation model without an update of an entirety of the articulation model;
calculate, based on the single passes, in order along each hierarchical path of the hierarchical paths from the root link to a child link corresponding to a leaf node, a respective result of the virtual force and a corresponding change in velocity determined using the corresponding response matrix for the child link; and
apply the respective changes in velocity to the object rendered on the display, the respective changes in velocity being represented as movement of the object in accordance with the respective changes in velocity.

11. The articulation simulation system of claim 10, wherein the response matrix for each link of the articulation model is used to solve a full set of constraints for the hierarchical articulation model in an amount of time that is proportional to a number of links of the hierarchical articulation model.

12. The articulation simulation system of claim 10, wherein the instructions when executed further cause the articulation simulation system to:
compute the response matrix for the root link and the response matrix for each of the child links before determining the virtual force applied to the specified link, each response matrix being a recursively-defined matrix representing a change in velocity resulting from a spatial force applied to the corresponding link.

13. The articulation simulation system of claim 10, wherein the respective changes in velocity are calculated using only one calculation pass for each link in the hierarchical articulation model, and wherein the impact of the virtual force is calculated using a dedicated solver for recursively solving for constraints from a root link to each leaf link of the hierarchical articulation model.

14. The articulation simulation system of claim 13, wherein the constraints include one or more internal or external constraints relating to a limit, a drive, friction, a static interaction, or a kinematic interaction.

15. The articulation simulation system of claim 13, wherein the solver utilizes an iterative algorithm based on a projected Gauss-Seidel approach, a temporal Gauss-Seidel approach, or a Jacobi approach.

16. A computer-implemented method, comprising:
determining a respective response matrix for each link of a hierarchical articulation model associated with an object to be rendered on a display, the hierarchical articulation model consisting of a root link and a plurality of child links, wherein the response matrix is computed using an arbitrary spatial force applied to the root link and the response matrix for a root node being a spatial articulated inverse inertia matrix;
storing the response matrix for each node to be available for use in one or more subsequent calculations without recalculation;
determining a virtual force applied to a specified link of the hierarchical articulation model;
calculating, based on a single pass along each child link of the plurality of child links and using the response matrix for the root link, an impact of the virtual force on the root link and a corresponding change in velocity for each direct child link of the root link, wherein a set of constraints of the articulation model is solved in the single pass using the response matrix, wherein the constraints affecting a parent node are to be solved prior to the constraints affecting a child node in the single pass, wherein localized velocity changes are to be computed using a subset of the articulation model without an update of an entirety of the articulation model;
calculating, based on the single passes, in order along each hierarchical path of the hierarchical paths from the root link to a child link corresponding to a leaf node, a respective result of the virtual force and a corresponding change in velocity determined using the corresponding response matrix for the child link; and
applying the respective changes in velocity to the object rendered on the display, the respective changes in velocity being represented as movement of the object in accordance with the respective changes in velocity.

17. The computer-implemented method of claim 16, wherein the response matrix for each link of the articulation model is used to solve a full set of constraints for the hierarchical articulation model in an amount of time that is proportional to a number of links of the hierarchical articulation model.

18. The computer-implemented method of claim 16, further comprising:
computing the respective response matrix for the root link and the child links before determining the virtual force applied to the specified link, each response matrix being a recursively-defined matrix representing a change in velocity resulting from a spatial force applied to the corresponding link.

19. The computer-implemented method of claim 16, wherein the respective changes in velocity are calculated using only one calculation pass for each link in the hierarchical articulation model, and wherein the impact of the virtual force is calculated using a dedicated solver for recursively solving for constraints from a root link to each leaf link of the hierarchical articulation model.

20. The computer-implemented method of claim 19, wherein the constraints include one or more internal or external constraints relating to at least one of: a limit, a drive, friction, a static interaction, or a kinematic interaction.

* * * * *